(12) United States Patent
Bash et al.

(10) Patent No.: US 10,096,045 B2
(45) Date of Patent: Oct. 9, 2018

(54) TYING OBJECTIVE RATINGS TO ONLINE ITEMS

(71) Applicant: Wal-Mart Stores, Inc., Bentonville, AR (US)

(72) Inventors: David Stephen Bash, San Francisco, CA (US); David Patterson, Berkeley, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 1228 days.

(21) Appl. No.: 13/907,478

(22) Filed: May 31, 2013

(65) Prior Publication Data
US 2014/0358819 A1 Dec. 4, 2014

(51) Int. Cl.
*G06Q 30/00* (2012.01)
*G06Q 30/02* (2012.01)

(52) U.S. Cl.
CPC .................. *G06Q 30/0282* (2013.01)

(58) Field of Classification Search
CPC .... G06Q 30/02; G06Q 10/10; G06Q 30/0201; G06Q 30/0601; G06Q 30/0202; G06Q 30/0203; G06Q 30/0217; G06Q 40/025; G06Q 30/0251; G06Q 30/0641; G06Q 50/01; G06Q 30/0204; G06Q 30/0241; G06Q 30/0255; G06Q 30/0282
USPC ......................... 705/14.6, 347, 14.49, 14.44
See application file for complete search history.

(56) References Cited

U.S. PATENT DOCUMENTS

| | | | | |
|---|---|---|---|---|
| 7,433,832 B1* | 10/2008 | Bezos | ................... | G06Q 10/10 |
| | | | | 705/26.8 |
| 8,121,902 B1* | 2/2012 | Desjardins | ......... | G06Q 30/0601 |
| | | | | 705/26.1 |
| 8,271,878 B2 | 9/2012 | Kane | | |
| 8,296,291 B1 | 10/2012 | Desjardins | | |
| 8,321,300 B1 | 11/2012 | Bockius | | |
| 9,396,490 B1* | 7/2016 | Marx | ................. | G06Q 30/0282 |
| 2004/0133463 A1* | 7/2004 | Benderev | ............... | G06Q 30/02 |
| | | | | 705/14.19 |
| 2006/0129446 A1* | 6/2006 | Ruhl | .................. | G06F 17/30873 |
| | | | | 705/306 |
| 2008/0109232 A1 | 5/2008 | Musgrove | | |
| 2008/0133488 A1 | 6/2008 | Bandaru | | |
| 2008/0189274 A1* | 8/2008 | Mann | ................. | G06F 17/30864 |
| 2009/0063247 A1* | 3/2009 | Burgess | .................. | G06Q 30/02 |
| | | | | 705/7.34 |
| 2009/0299824 A1* | 12/2009 | Barnes, Jr. | .......... | G06F 3/04847 |
| | | | | 705/7.39 |
| 2011/0064221 A1* | 3/2011 | McSherry | ................ | H04K 1/02 |
| | | | | 380/252 |
| 2012/0066084 A1* | 3/2012 | Sneyders | ............... | G06Q 30/02 |
| | | | | 705/26.1 |
| 2012/0254060 A1 | 10/2012 | Choudhary | | |
| 2013/0159056 A1* | 6/2013 | Doig | .................. | G06Q 30/0203 |
| | | | | 705/7.32 |

\* cited by examiner

*Primary Examiner* — Jamie H Austin
(74) *Attorney, Agent, or Firm* — Bryan Cave Leighton Paisner LLP

(57) ABSTRACT

The present disclosure extends to methods, systems, and computer program products for providing item reviews to an online customer from third party sources during a shopping session on a retail website.

20 Claims, 6 Drawing Sheets

TYING OBJECTIVE RATINGS TO ONLINE ITEMS

BACKGROUND

With the increased popularity of online shopping more and more customers are making purchasing decisions while shopping on the internet. One of the primary reasons that consumers visit online merchandise sites is to research and compare items of interest. Large online retailers and merchants offer substantial databases of consumer-supplied comments and ratings of items, services and vendors. It may be difficult for smaller, or newer, online retailers to rapidly accumulate item reviews and ratings in order to be competitive because potential customers have begun to expect this additional feature. Furthermore, new products may have undeserved low sales because it takes time for reviews to accumulate to a meaningful level, and for products that are purchased with less frequency, item ratings and reviews can be disproportionately skewed by a single positive or negative review.

Additionally, less popular items of the same class may be unduly prejudiced by the lack of reviews, simply because the more popular item has a greater number of reviews and recommendations even though the less popular item may be superior or offer new features. In many cases, newer and more complex items may be reviewed by organizations specializing in product testing and comparison. Such organizations may provide reviews for items and classes of items that are publically available or may require a membership for access. Using either publically available reviews or non-publically available reviews (behind a "paywall") that require membership, online customers would be aided in their decision making with access to such expert reviews.

Furthermore, it may be difficult for online customers to effectively compare items that are not identical, or substantially identical, because the description provided by the online merchant may be formatted or presented differently from the description provided by another online merchant.

Because of these problems, both customers and retailers may miss the opportunities provided by a more diverse market place. What is needed are systems and methods that can readily provide publicly available and non-publically available reviews for specific items and classes of items while a customer shops on a retailers website. As will be seen, the disclosure provides such methods and systems for providing meaningful reviews during an online shopping session for the items of interest in an effective and elegant manner.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
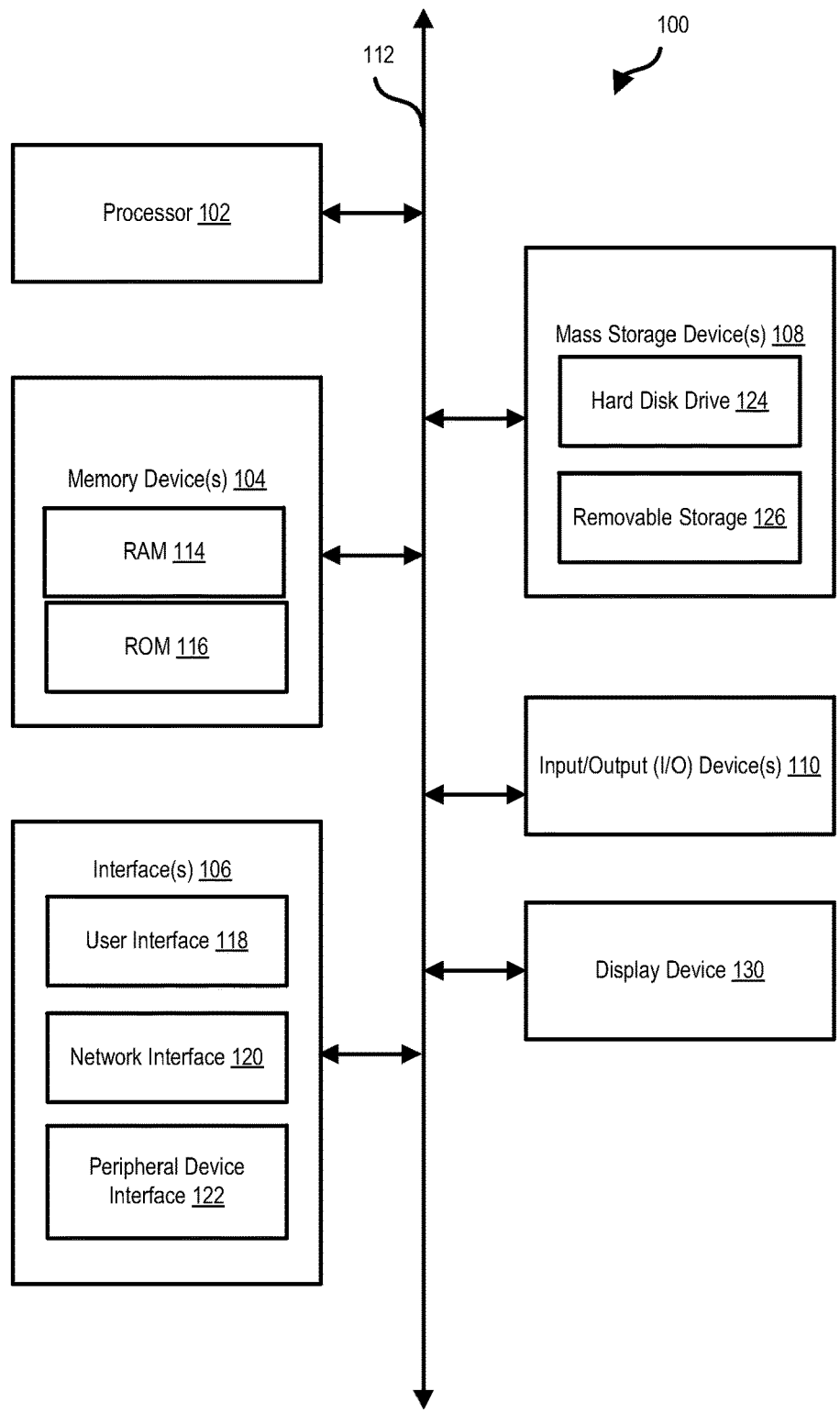
FIG. 1 illustrates an example block diagram of a computing device capable of performing the computer instructions and processes of the methods disclosed herein.

The present disclosure extends to methods, systems, and computer program products for providing item reviews to a customer during an online shopping session. In the following description of the present disclosure, reference is made to the accompanying drawings, which form a part hereof, and in which is shown by way of illustration specific implementations in which the disclosure may be practiced. It is to be understood that other implementations may be utilized and structural changes may be made without departing from the scope of the present disclosure. The methods and systems disclosed herein will provide an alternative to relying on crowd source ratings, which are easily manipulated for less popular items because of the relatively few reviews.

Implementations of the present disclosure may comprise or utilize a special purpose or general-purpose computer, including computer hardware, such as, for example, one or more processors and system memory as discussed in greater detail below. Implementations within the scope of the present disclosure also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice-versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered storage, such as FusionIO). Thus, it should be understood that computer storage media (devices) can be included in computer system components that also (or even primarily) utilize transmission media.

Computer-executable instructions comprise, for example, instructions and data, which, when executed at a processor, cause a general purpose computer, special purpose computer, or special purpose processing device to perform a certain function or group of functions. The computer executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the disclosure can also be used in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, or any suitable characteristic now known to those of ordinary skill in the field, or later discovered), service models (e.g., Software as a Service (SaaS), Platform as a Service (PaaS), Infrastructure as a Service (IaaS)), and deployment models (e.g., private cloud, community cloud, public cloud, hybrid cloud, or any suitable service type model now known to those of ordinary skill in the field, or later discovered). Databases and servers described with respect to the present disclosure can be included in a cloud model.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

As used herein, the phrase "public review" is intended to denote item reviews that are available to any user online without membership to the source of the review.

As used herein, the phrase "non-public review" is intended to mean item reviews that are not available to all users, and may be available according to membership to the source of the review. Furthermore, availability may be achieved by contractual agreements, but may also be achieved independently by the website publisher or online merchant and may be provided by a link to any other URL.

As used herein, the phrase "item class" or "class of item" is intended to denote a group of items and products that perform substantially the same functions and fulfill the same needs. Accordingly, such items and products may be readily compared and reviewed.

FIG. 1 is a block diagram illustrating an example computing device 100. Computing device 100 may be used to perform various procedures, such as those discussed herein. Computing device 100 can function as a server, a client, or any other computing entity. Computing device 100 can perform various monitoring functions as discussed herein, and can execute one or more application programs, such as the application programs described herein. Computing device 100 can be any of a wide variety of computing devices, such as a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer-readable media, such as cache memory.

Memory device(s) 104 include various computer-readable media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer readable media, such as magnetic tapes, magnetic disks, optical disks, solid-state memory (e.g., Flash memory), and so forth. As shown in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, microphones, monitors or other display devices, speakers, printers, network interface cards, modems, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments. Example interface(s) 106 may include any number of different network interfaces 120, such as interfaces to local area networks (LANs), wide area networks (WANs), wireless networks, and the Internet. Other interface(s) include user interface 118 and peripheral device interface 122. The interface(s) 106 may also include one or more user interface elements 118. The interface(s) 106 may also include one or more peripheral interfaces such as interfaces for printers, pointing devices (mice, track pad, or any suitable user interface now known to those of ordinary skill in the field, or later discovered), keyboards, and the like.

Bus 112 allows processor(s) 102, memory device(s) 104, interface(s) 106, mass storage device(s) 108, and I/O device (s) 110 to communicate with one another, as well as other devices or components coupled to bus 112. Bus 112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 100, and are executed by processor(s) 102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 2:
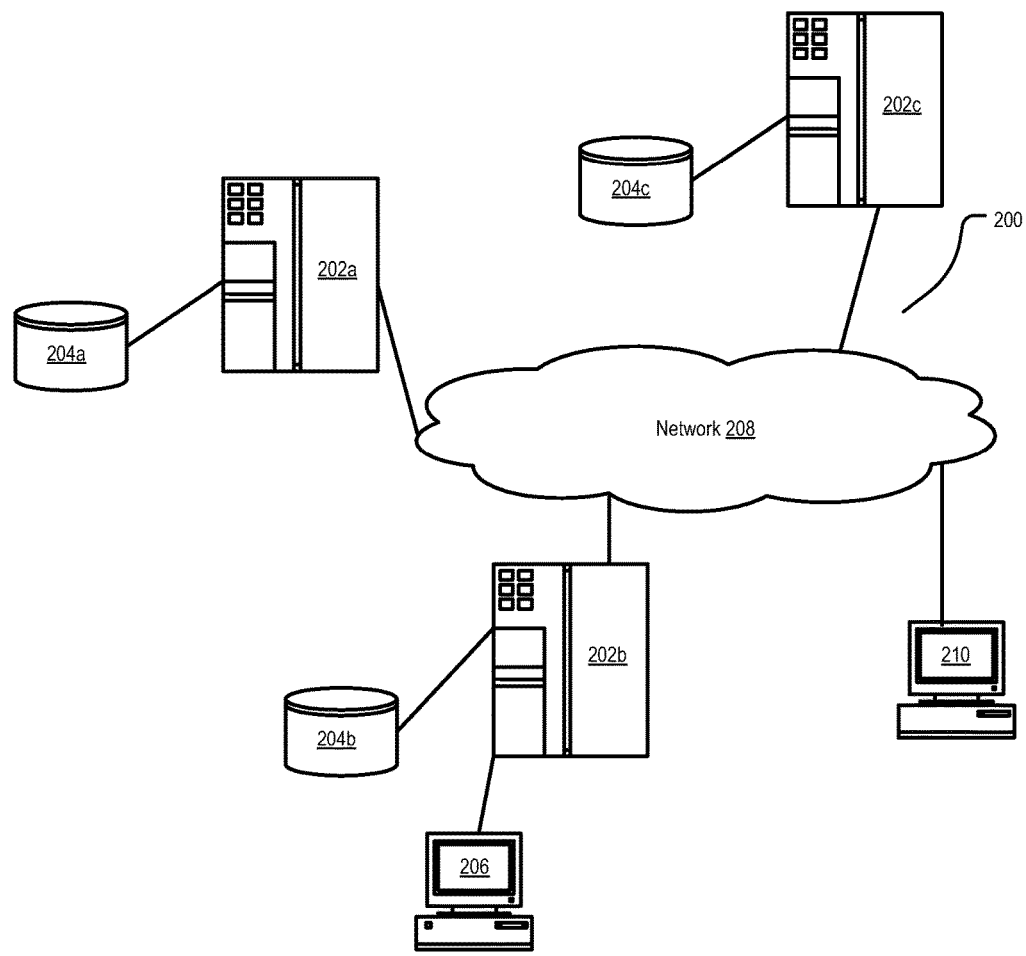
FIG. 2 illustrates an example computer and network architecture that facilitates different implementations described herein.

FIG. 2 illustrates an example of a computing environment 200 suitable for implementing the methods disclosed herein. In some implementations, a server 202a provides public access to a database 204a in data communication therewith. The database 204a may store item information and may record information such as item features and public item reviews. The database 204a may additionally store item feature information contained in a plurality of records for a class of items. The server 202a may provide public access to the database 204a to users and customers associated with a retailer, merchant or other user. The server 202a may provide and allow access to original source systems such as, for example, Consumer Reports™, Cnet™, and the like that provide public item review information. For example, the server 202a may implement a web server for receiving requests for data stored in the database 204a and formatting requested information into web pages that may be provided to customers during online shopping. The web server may additionally be operable to receive information and store the information in the database 204a.

A server 202b may be associated with a retail merchant or by another entity providing item review services. The server 202b may be in data communication with a database 204b.

The database 204b may store information regarding various products and item reviews. In particular, information for a product may include a name, description, categorization, reviews, comments, price, past transaction data, and the like. The server 202b may analyze this data as well as data retrieved from the database 204a and 204c in order to perform methods as described herein. An operator may access the server 202b by means of a workstation 206 that may be embodied as any general purpose computer, tablet computer, smart phone, or the like.

A server 202c provides non-public access to a database 204c in data communication therewith. The database 204c may store item information and may record information such as item features and non-public item reviews. The database 204c may additionally store item feature information contained in a plurality of records for a class of items. The server 202c may provide non-public access to the database 204c to users and customers associated with a retailer, merchant or other user. The server 202c may require logins based on membership in order to provide access. The server 202c may provide and allow access to original source systems such as, for example, Consumer Reports™, Cnet™, and the like that provide public item review information. For example, the server 202c may implement a web server for receiving requests for data stored in the database 204c and formatting requested information into web pages that may be provided to customers during online shopping. The web server may additionally be operable to receive information and store the information in the database 204c.

The server 202a, server 202b and server 202c may communicate over a network 208 such as the Internet or some other local area network (LAN), wide area network (WAN), virtual private network (VPN), or other network. A user may access data and functionality provided by the servers 202a, 202b, 202c by means of a workstation 210 in data communication with the network 208. The workstation 210 may be embodied as a general purpose computer, tablet computer, smart phone or the like. For example, the workstation 210 may host a web browser for requesting web pages, displaying web pages, and receiving user interaction with web pages, and performing other functionality of a web browser. The workstation 210, workstation 206, servers 202a, 202b, 202c and databases 204a, 204b, 202c may have some or all of the attributes of the computing device 100.

Figure 3:
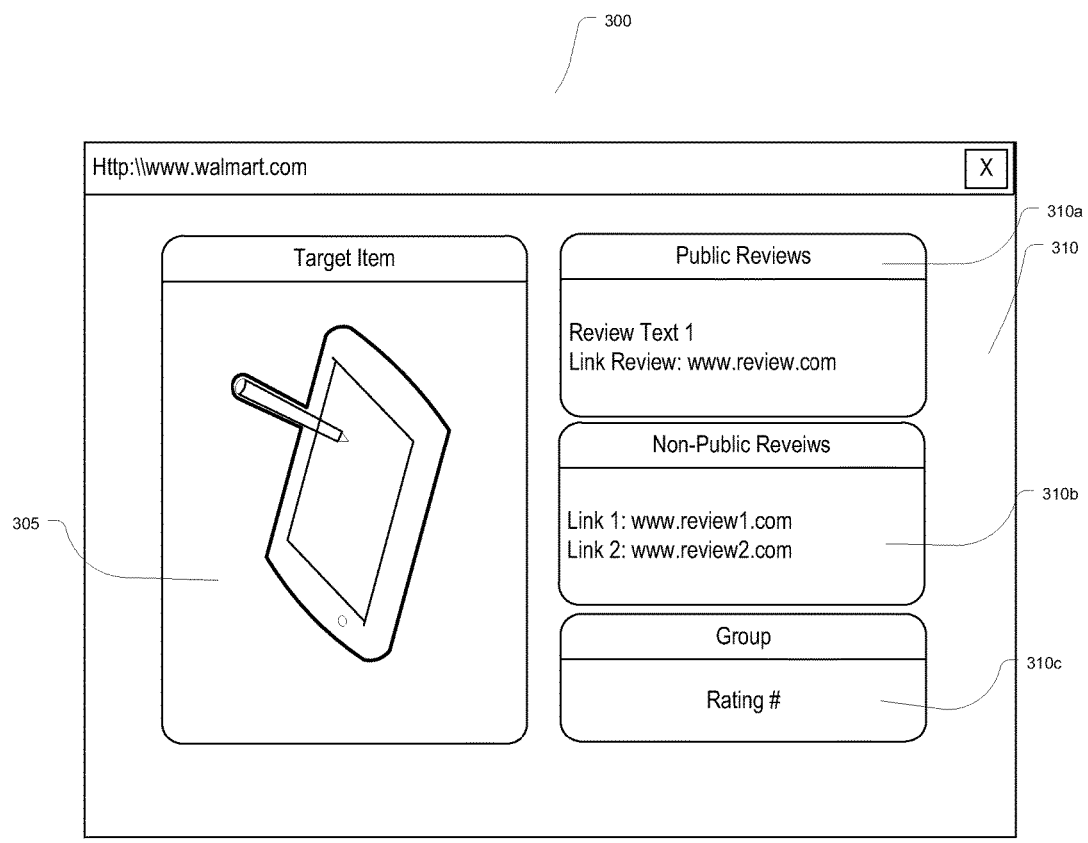
FIG. 3 illustrates an example of a retail webpage providing item reviews in accordance with the teachings and principles of the disclosure.

With reference primarily to FIG. 3, an implementation of webpage providing item reviews will be discussed. Among the reasons that consumers visit online merchandise sites is to research and compare items of interest. Sites such as Amazon.com™ offer substantial databases of consumer-supplied comments and ratings of items, services and vendors. As can be seen in the figure, a webpage 300 may comprise a target item portion 305 containing information regarding a target item. A target item is the item for which an online shopper is actively shopping. In an example of an online shopping session, illustrated in FIG. 3, the target item is a tablet computer. The target item portion 305 may comprise a picture of the target item, a description of the target item, the price of the target item, and any other data that corresponds to the target item as offered by the owner of the website.

As illustrated in FIG. 3, the webpage 300 may further comprise a review portion 310 that may comprise reviews and ratings of the target item. The reviews may be provided by other customers of the retailer or may be gathered from third party sources. The reviews may pertain to identical items to the target item or may pertain to reviews based on the item class to which the target item belongs. The reviews may be organized such that both positive and negative reviews are represented. As can be seen in the figure, the item review portion 310 may be subdivided and include a public review portion 310a. The public review portion 310a may comprise public reviews that are readily available to all customers. Furthermore, the public reviews may be accessed by way of a provided link to a URL (uniform recourse locator) that contains the actual review. Additionally, text of the review may also be provided in the webpage either in its entirety or in a portion of the review. It should be noted that any web supported display functionality is to contemplated as part of the disclosure as a means for displaying the reviews to a user, such as for example, popups, links, drop down, tabs and the like. In an implementation, it may be desirable to keep a shopper on the same webpage to provide convenience and to prevent the shopper from leaving the webpage or buying elsewhere online.

As further illustrated in FIG. 3, the item review portion 310 may be subdivided and include a non-public review portion 310b. The non-public review portion 310b may comprise non-public reviews that are not readily available to all users, and may require membership in order to access the reviews. The owner of the website 300 may provide the non-public reviews after the online shopper has met a threshold. For example, the threshold may be that a customer has previously purchased items from the website owner, or that the customer has used certain services of the website owner. Access to the source of the non-public reviews may be provided through the servers of the website owner, and/or through various web protocols through links provided on the webpage. Furthermore, the non-public reviews may be accessed automatically or manually by way of a provided link to a URL that contains the actual review stored on a source server. In an implementation, text of the review may also be provided in the webpage either in its entirety or in a portion of the review. It should be noted that any web supported display functionality is to contemplated as part of the disclosure as a means for displaying the reviews to a user, such as for example, popups, links, drop down, tabs and the like. In an implementation, it may be desirable to keep a shopper on the same webpage to provide convenience and to prevent the shopper from leaving the webpage or buying elsewhere online.

Additionally, the webpage 300 may further comprise an item rating portion 310c. The ratings may be based on reviews and ratings from third party sources as discussed above. The rating may summarize more comprehensive review data for the convenience of the customer. The rating portion may comprise both positive and negative ratings. As can be seen by the exemplary webpage 300 and discussed above, a customer may be provided with both public and non-public reviews relating to a target item in a convenient and elegant manner on a single webpage.

Figure 4:
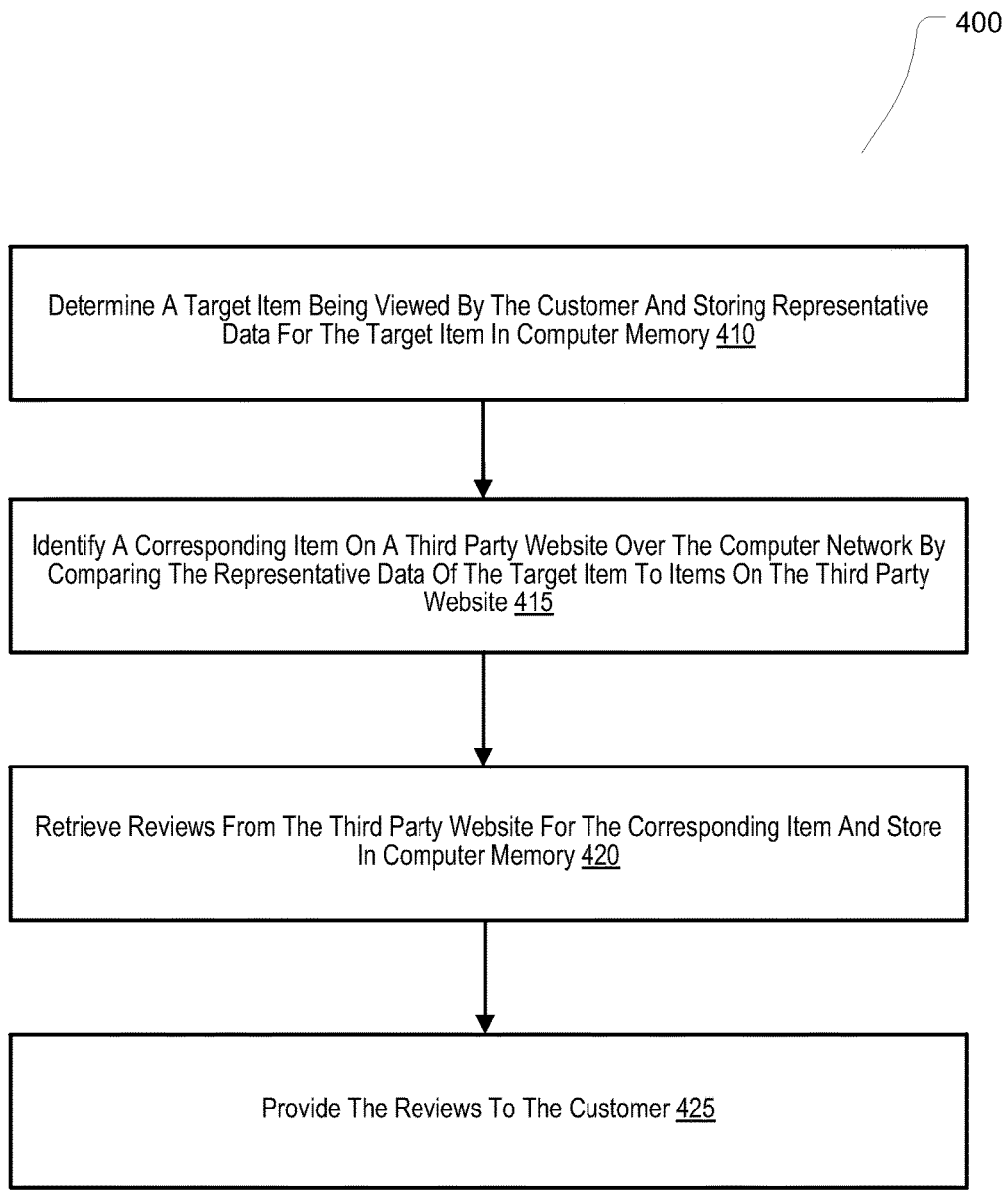
FIG. 4 illustrates an example method according to one implementation consistent with the teachings and principles of the disclosure.

As will be discussed with reference primarily to FIG. 4, the disclosure proposes to provide online shoppers objective and thorough reviews and ratings of the items they are currently shopping for. As will be discussed, an implementation may provide item reviews by linking online items and vendors to third party evaluations by organizations and individuals.

In use, method 400 for providing a review for a target item may be initiated by a customer who enters a merchant's website to shop for a target item. At 410 of method 400, the target item may be identified from within the merchant's data base 204b of products that may be accessed through server 202b of FIG. 2. The determination of the target product may be derived when the customer selects a product from a search result performed on the merchant's system. Data associated with the target item may then be stored in computer memory to be used in identifying corresponding items on third party websites for the purpose of gathering item reviews.

At 415, corresponding items may be identified on third party websites and in third party databases (such as 204a and 204c of FIG. 2). The data associated with the target item that has been stored in memory may be compared to the data associated with a corresponding item on the third party databases in order to determine the correspondence. In an implementation, the data associated with the corresponding item may comprise a review of the item. As discussed above, the review of the item may be a public or non-public review. Additionally, there may be a plurality of reviews available corresponding to a target item in certain implementations. Online retailers currently have technology to identify identical and nearly identical items in the retailer's item database when compared to offerings by competitors, such as Amazon.com™ and other large notable online retailers that are also known for having large bodies of item reviews. As will be discussed in further detail below, organizations, such as Consumer Reports™, can provide reviews and comparisons for classes of items that may also be presented to a customer while shopping online.

At 420, the item reviews for the identified corresponding items may be retrieved and stored on the merchant's database to be used later in creating a webpage that will be provided to a customer at 425. As discussed above, the reviews may be a public review that is readily available to the public, or the reviews may be non-public reviews where access may be facilitated by the merchant.

At 425, the reviews may be provided to a customer to aid the customer in making an informed decision regarding the purchase of the target item. As illustrated in FIG. 3, the reviews may be provided to the customer in a webpage as part of an item listing during a shopping session.

Accordingly, method 400 provides a method for providing relevant reviews of a target item to a customer during an online shopping session by finding reviews for corresponding products on third party databases, and then offering those reviews to the customer within the merchant's target item webpage.

Figure 5:
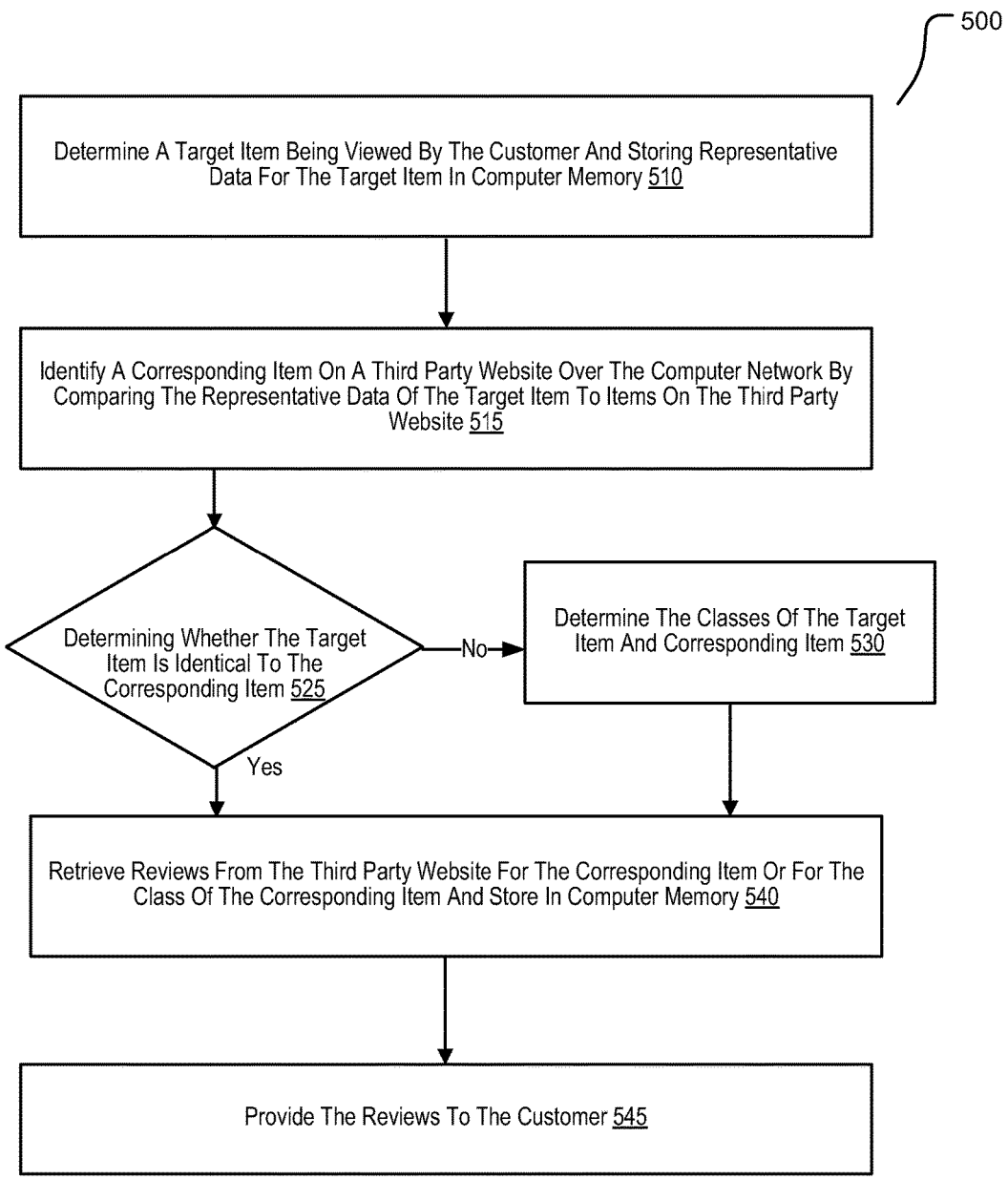
FIG. 5 illustrates a flow chart of an example method according to one implementation consistent with the teachings and principles of the disclosure.

With reference primarily to FIG. 5, a method for providing relevant target item reviews that may include relevant reviews for non-identical corresponding items will be discussed. Often a customer may not know exactly which item from within a category of items that they may wish to purchase. For example, a customer may wish to purchase a video camera, but may not have made a decision about the exact camera to buy. In certain situations, the customer may not care which brand of item they may wish to purchase, and they simply want to buy the current "best" item from within a class of items. Under such a circumstance, reviews for similar items from within the same item class would be of interest to the customer, and comparison reviews would be of great interest. Method 500 of FIG. 5 discloses a method for providing such reviews to a customer.

At 510 of method 500, the target item may be identified from within the merchant's data base 204b of products that may be accessed through server 202b of FIG. 2. The determination of the target product may be derived when the customer selects a product from a search result performed on the merchant's system. Data associated with the target item may then be stored in computer memory to be used in identifying corresponding items on third party websites for the purpose of gathering item reviews.

At 515, corresponding items may be identified on third party websites and in third party databases (such as 204a and 204c of FIG. 2). The data associated with the target item that has been stored in memory may be compared to the data associated with a corresponding item on the third party databases in order to determine the correspondence. The correspondence of the items on the third party databases may have a threshold of correspondence, such that a plurality of items may be identified that may be from within the same class of items, but may not be identical. The corresponding items may perform similar functions as the target item, but may differ as to brand or model. In an implementation, the data associated with the corresponding item may comprise a review of the item. As discussed above, the review of the item may be a public or non-public review. Additionally, there may be a plurality of reviews available corresponding to a target item in certain implementations. Online retailers currently have technology to identify identical and nearly identical items in the retailer's item database when compared to offerings by competitors, such as Amazon.com™ and other large notable online retailers that are also known for having large bodies of item reviews. As will be discussed in further detail below, organizations, such as Consumer Reports™, can provide reviews and comparisons for classes of items that may also be presented to a customer while shopping online.

At 525, it is determined as to whether the target item is identical to each of the corresponding items. The corresponding items may be of the same class as the target item and serve the same purposes to the customer. The differences between the target item and corresponding item may be found in comparing the representative data stored for the items respectively. If the items are determined to be not identical, at 530 the class of the target item and the corresponding item may be determined such that reviews can be provided for similar corresponding items from the same class. Indeed, a customer may prefer to see reviews for a plurality of members of a class in order to make a purchasing decision.

At 540, the item reviews for the identified corresponding items and/or item class may be retrieved from a third party database and to be used later in creating an item webpage that will be provided to a customer at 545. As discussed above, the reviews may be a public review that is readily available to any member of the public, or the reviews may be non-public where access may be facilitated by the merchant.

At 545, the reviews may be provided to a customer to aid the customer in making an informed decision regarding the purchase of the target item. As illustrated in FIG. 3, the reviews may be provided to the customer in a webpage as part of an item listing during a shopping session.

Accordingly, method 500 provides a method for presenting relevant reviews regarding a target item to a customer by finding reviews for corresponding products on third party databases, and then offering those reviews to the customer within the merchant's target item webpage.

Figure 6:
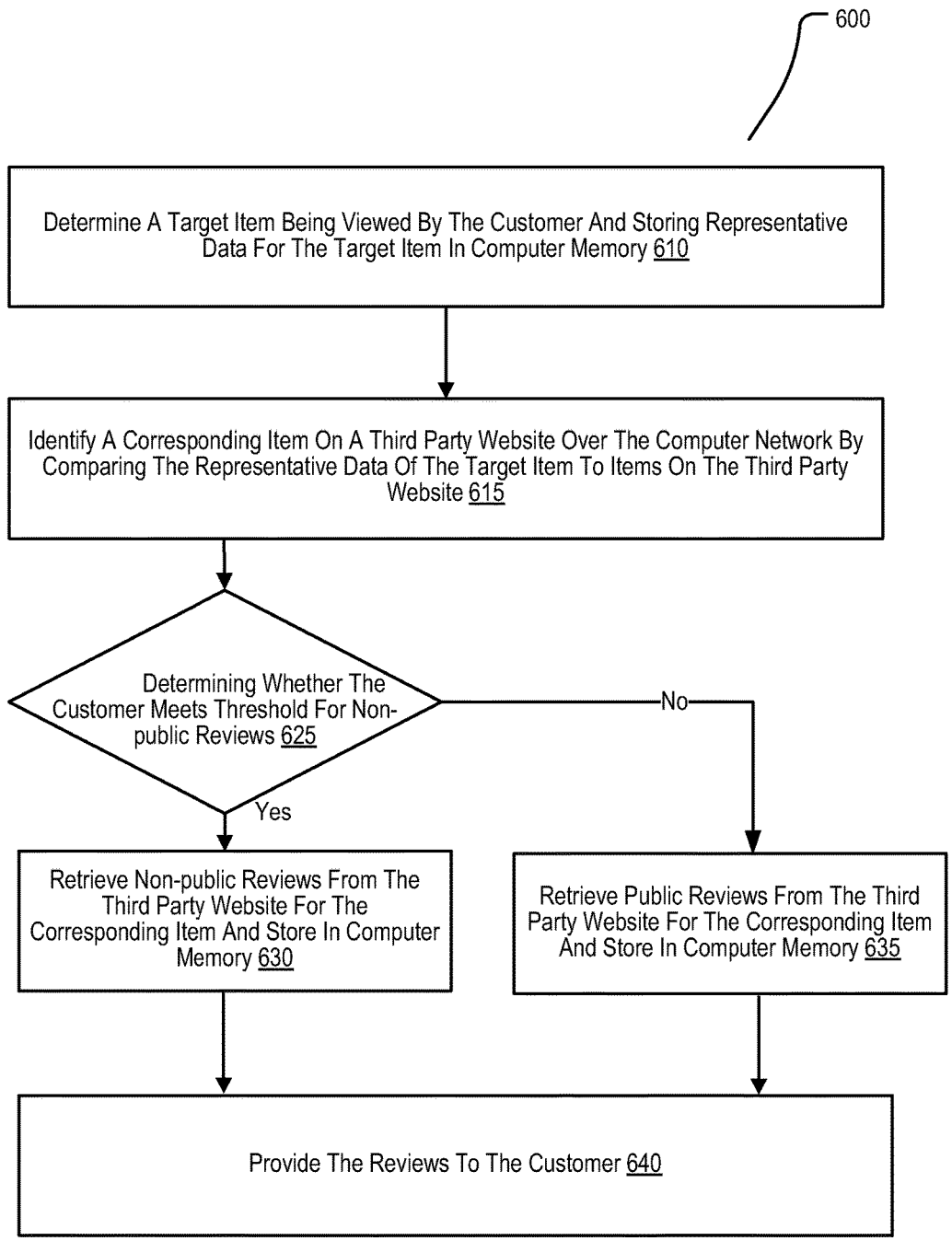
FIG. 6 illustrates an example method according to one implementation consistent with the teachings and principles of the disclosure.

With reference primarily to FIG. 6, a method for providing relevant target item reviews that may include non-public relevant reviews for corresponding items to qualifying customers will be discussed. A retailer may wish to provide additional services to certain customers that have been determined to meet a predetermined threshold. The additional services may come in the form of providing access to non-public item reviews that may be behind a "paywall" that excludes non-members from viewing the review. Non-public reviews may typically include comparisons of items within the same item class, and may be written by experts, such that the non-public reviews are generally more desirable. In some instances, membership to the sources of the non-public reviews may be required, and may typically cost money to access. Under some circumstances a customer may not know exactly which item from within a category of items that they may wish to purchase. For example, a customer may wish to purchase a video camera, but may not have made a decision about the exact camera to buy. In certain situations, the customer may not care which brand of item they may wish to purchase, and they simply want to buy the current "best" item from within a class of items. Under such a circumstance, reviews for similar items from within the same item class would be of interest to the customer, and comparison reviews would be of great interest. Method 600 of FIG. 6 discloses method for providing more valuable reviews to customers that meet a predetermined threshold.

At 610 of method 600, a target item may be identified from within the merchant's data base 204b of products that may be accessed through server 202b of FIG. 2. The determination of the target product may be derived from a customer selection performed on the merchant's system. Data associated with the target item may then be stored in computer memory to be used in identifying corresponding items on third party websites for the purpose of gathering item reviews.

At 615, corresponding items may be identified on third party websites and in third party databases (such as 204a and 204c of FIG. 2). The data associated with the target item that has been stored in memory may be compared to the data associated with a corresponding item on the third party databases in order to determine the correspondence. The correspondence of the items on the third party databases may have a threshold of correspondence, such that a plurality of items may be identified that may be from within the same class of items, but may not be identical. In an implementation, the data associated with the corresponding item may comprise a review of the item. As discussed above, the review of the item may be a public or non-public review. Non-public reviews may be provided by organizations such as Consumer Reports™ that can provide reviews and comparisons for classes of items for members and subscribers of the organization.

At 625, it is determined as to whether the customer meets a predetermined threshold for providing non-public reviews. The threshold may be set by the merchant according to characteristics of the customer, and/or characteristics of the target item. To meet the threshold, a customer for example may be required to spend a certain amount of money with the merchant, or may have to participate in information gathering (survey participation) for the benefit of the merchant. If the customer meets the threshold, at 630 access to non-public reviews may be facilitated and the non-public item reviews for the identified corresponding items may be retrieved from a third party database and used later in creating an item webpage that will be provided to the customer at 640. In an implementation, a merchant's website applying the methods of this disclosure may choose to offer or sponsor access to non-public reviews to its favored customers as an incentive or reward for visiting the site regularly.

If it is determined that that the customer does not meet the threshold, at 635, public item reviews for the identified corresponding items may be retrieved from a third party database and used later in creating an item webpage that will be provided to the customer at 640.

As illustrated in FIG. 3, the reviews may be provided to the customer in a webpage as part of an item listing during a shopping session. Accordingly, method 600 provides a method for presenting relevant non-public and/or public reviews to a customer within the merchant's target item webpage.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

The invention claimed is:

1. A method for execution by one or more computer servers associated with a merchant website of a merchant comprising:
   providing one or more computer databases that include data configured to create item webpages for the merchant website, wherein:
      the data includes first reviews that are retrieved from one or more third party databases stored on one or more third party servers, and second reviews that are provided by customers of the merchant website; and
      at least a portion of the first reviews are non-public reviews retrieved from the one or more third party databases;
   determining a target item, the target item viewed by a customer at the merchant website;
   storing representative data associated with the target item in computer memory;
   identifying a corresponding item on a third party website over a computer network by comparing the representative data associated with the target item to one or more items on the third party website, the one or more items comprising the corresponding item;
   retrieving one or more non-public reviews of the corresponding item from a third party database selected from the one or more third party databases after the customer has reached a predetermined threshold with the merchant, the third party database associated with the third party website, and the first reviews comprising the one or more non-public reviews;
   storing the one or more non-public reviews in the one or more computer databases; in response to the customer selecting a search result associated with the target item, causing the one or more computer servers to create an item webpage at the merchant website using the data stored in the one or more computer databases to create the item webpage at the merchant website, wherein:
      the item webpage is associated with the target item; and
      the item webpage is created, at least in part, by defining an item review section that combines the one or more non-public reviews of the corresponding item that are from the third party database with one or more reviews of the target item that are received directly through the merchant website, the second reviews comprising the one or more reviews; and
   providing the one or more non-public reviews of the corresponding item that are from the third party database and the one or more reviews of the target item that are received directly through the merchant website to the customer within the item webpage.

2. The method of claim 1, further comprising:
determining whether the target item is identical to the corresponding item on the third party website.

3. The method of claim 1, further comprising:
determining a class of the target item;
wherein:
   the corresponding item on the third party website is from within a same class as the target item.

4. The method of claim 3, wherein:
one or more other reviews for other items from within the class are provided to the customer.

5. The method of claim 1, wherein:
the third party database further comprises one or more public reviews that are available for public viewing.

6. The method of claim 1, wherein:
a rating based at least in part on the one or more non-public reviews is provided for the target item.

7. The method of claim 1, wherein:
the predetermined threshold is a predetermined amount of money the customer has spent with the merchant.

8. The method of claim 1, wherein:
the predetermined threshold is a survey that the customer has completed for the merchant.

9. The method of claim 1, wherein:
the one or more non-public reviews in the third party database are behind a paywall.

10. The method of claim 1, further comprising:
determining whether the target item is identical to the corresponding item on the third party website; and
determining a class of the target item;
wherein:
   the corresponding item on the third party website is from within a same class as the target item;
   one or more other reviews for other items from within the class are provided to the customer;
   the third party database further comprises one or more public reviews that are available for public viewing;
   a rating based at least in part on the one or more non-public reviews is provided for the target item;
   the predetermined threshold is at least one of:
      a predetermined amount of money the customer has spent with the merchant; or
      a survey that the customer has completed for the merchant; and
   the third party database requires payment to retrieve the one or more non-public reviews.

11. A system comprising:
(a) one or more processors;
(b) one or more computer databases that include data configured to create item webpages for a merchant website;
   wherein the data includes first reviews that are retrieved from one or more third party databases stored on one or more third party servers, and second reviews that are provided by customers of the merchant website; and
   wherein at least a portion of the first reviews are non-public reviews retrieved from the one or more third party databases; and (c) one or more computer servers associated with the merchant website and being coupled to the one or more computer databases, each of the one or more computer servers including one or more non-transitory memory devices operably coupled to the one or more processors and storing executable and operational data, the executable and operational data effective to cause the one or more processors to:
  determine a target item, the target item viewed by a customer at the merchant website; and
  store representative data associated with the target item in computer memory;
  identify a corresponding item on a third party website over a computer network by comparing the representative data associated with the target item to one or more items on the third party website, the one or more items comprising the corresponding item;
  retrieve one or more non-public reviews of the corresponding item from a third party database selected from the one or more third party databases after the customer has reached a predetermined threshold with a merchant, the third party database being associated with the third party website, and the first reviews comprising the one or more non-public reviews;
  store the one or more non-public reviews in the one or more computer databases;
  in response to the customer selecting a search result associated with the target item, causing the one or more computer servers to create an item webpage at the merchant website using the data stored in the one or more computer databases, wherein:
    the item webpage is associated with the target item; and
    the item webpage is created, at least in part, by defining an item review section that combines the one or more non-public reviews of the corresponding item that are from the third party database with one or more reviews of the target item that are received directly through the merchant website, the second reviews comprising the one or more reviews; and
  provide the one or more non-public reviews of the corresponding item that are from the third party database and the one or more reviews of the target item received directly through the merchant website to the customer within the item webpage.

12. The system of claim 11, wherein the executable and operational data is effective to further cause the one or more processors to:
  determine whether the target item is identical to the corresponding item on the third party website.

13. The system of claim 12, wherein the executable and operational data is effective to further cause the one or more processors to:
  determine a class of the target item;
  wherein:
    the corresponding item on the third party website is from within a same class as the target item.

14. The system of claim 13, wherein:
one or more other reviews for other items from within the class are provided to the customer.

15. The system of claim 11, wherein:
the third party database further comprises one or more public reviews that are available for public viewing.

16. The system of claim 11, wherein:
a rating based at least in part on the one or more non-public reviews is provided for the target item.

17. The system of claim 11, wherein:
the predetermined threshold is a predetermined amount of money the customer has spent with the merchant.

18. The system of claim 11, wherein:
the predetermined threshold is a survey that the customer has completed for the merchant.

19. The system of claim 11, wherein:
the one or more non-public reviews in the third party database are behind a paywall.

20. The system of claim 11, wherein:
the executable and operational data is effective to further cause the one or more processors to:
  determine whether the target item is identical to the corresponding item on the third party website; and
  determine a class of the target item;
the corresponding item on the third party website is from within a same class as the target item;
one or more other reviews for other items from within the class are provided to the customer;
the third party database further comprises one or more public reviews that are available for public viewing;
a rating based at least in part on the one or more non-public reviews is provided for the target item;
the predetermined threshold is at least one of:
  a predetermined amount of money the customer has spent with the merchant; or
  a survey that the customer has completed for the merchant; and
the third party database requires payment to retrieve the one or more non-public reviews.

* * * * *